(12) United States Patent
Eubank et al.

(10) Patent No.: US 10,887,444 B2
(45) Date of Patent: Jan. 5, 2021

(54) DEVICE FOR COMMUNICATION WITH AN ANALOG TELEPHONE AND TELEPHONE INCORPORATING THE SAME

(71) Applicants: Nick Eubank, Santa Barbara, CA (US); John Stump, Santa Barbara, CA (US)

(72) Inventors: Nick Eubank, Santa Barbara, CA (US); John Stump, Santa Barbara, CA (US)

( * ) Notice: Subject to any disclaimer, the term of this patent is extended or adjusted under 35 U.S.C. 154(b) by 0 days.

(21) Appl. No.: 15/996,125

(22) Filed: Jun. 1, 2018

(65) Prior Publication Data

US 2019/0373100 A1 Dec. 5, 2019

(51) Int. Cl.
*H04M 1/725* (2006.01)

(52) U.S. Cl.
CPC ..... *H04M 1/72563* (2013.01); *H04M 1/7253* (2013.01); *H04M 1/72547* (2013.01)

(58) Field of Classification Search
CPC ........... H04M 1/72563; H04M 1/7253; H04M 1/72547
See application file for complete search history.

(56) References Cited

U.S. PATENT DOCUMENTS

| | | | | |
|---|---|---|---|---|
| 2003/0153355 A1* | 8/2003 | Warren | ............ | H04M 1/72527 455/557 |
| 2009/0163179 A1* | 6/2009 | Brannan | ............ | H04M 1/72547 455/412.2 |
| 2013/0150025 A1* | 6/2013 | Chen | ..................... | H04M 1/738 455/426.1 |

* cited by examiner

*Primary Examiner* — Chuong A Ngo
(74) *Attorney, Agent, or Firm* — Lyman Smith; Patent Service Assoc., Inc.

(57) ABSTRACT

A device permits a conventional, analog telephone to connect to a smart phone to provide access to various smart phone features from the analog telephone. For example, the analog telephone can receive or initiate calls and send or receive texts and may provide a secure access point to home automation devices, including Amazon Alexa, Google Home, or the like. The device may be a stand-alone device that connects to an analog telephone or may be integrated into a telephone of any desired design or style. A smart phone application may be used to connect the smart phone to one or more devices to selectively activate features of select ones of the analog telephones. In some embodiments, the device can have its own subscriber identity module (SIM) and its own telephone number to directly send and receive calls or text messages.

18 Claims, 8 Drawing Sheets

DEVICE FOR COMMUNICATION WITH AN ANALOG TELEPHONE AND TELEPHONE INCORPORATING THE SAME

BACKGROUND OF THE INVENTION

1. Field of the Invention

One or more embodiments of the invention relates generally to communication devices. More particularly, the invention relates to a device that can enable an analog, landline telephone to communicate with and function as an extension of a smart phone and/or an artificial intelligence (AI) device.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many designs that were present in the past become popular choices for people today. So-called vintage items often find their way back into home and business décor. However, certain vintage items may be suitable for decoration, but have lost their function due to changes in technology.

A 2015 study by the Center for Disease Control and Prevention found that about 47 percent of the households polled used only cell phones. The analog landline phone has become more and more obsolete. However, many people like the look of these "vintage" phones and often use them as decoration, even though they lack function.

In view of the foregoing, there is a need for a device that can provide function to vintage phones, including a device that can link a user's smart phone features and function to a vintage phone.

SUMMARY OF THE INVENTION

The smart phone has allowed more and more people the convenience of one phone number, unfortunately this has shadowed the utility, aesthetic quality, and enjoyment of multiple phones in a home, office, hotel or the like. The device according to exemplary embodiments of the present invention brings value back to the functional, stylish, conveniently placed tele-communication points throughout a living space that are landline phones. It allows people feel at ease with not being within arms-reach of their smart phone because throughout their home are wirelessly paired extensions of it.

Embodiments of the present invention provide a communications system comprising a software application resident on a smart phone; and a phone adapter configured to electronically attach to a landline telephone and a wireless transceiver configured to send and receive a wireless signal to and from the smart phone, wherein the software application on the smart phone is configured to enable the landline telephone to interact with the smart phone.

Embodiments of the present invention further provide a communication system comprising one or more phone adapters configured to (1) receive a first wireless signal from a smart phone and deliver a first analog signal to a landline telephone, the first analog signal corresponding to the first wireless signal and (2) receive a second analog signal from the landline telephone and deliver a second wireless signal to the smart phone, the second wireless signal corresponding to the second analog signal, wherein the first wireless signal is selected from an incoming call signal, a voice signal from a caller, a notification from the smart phone, and information from an artificial intelligence agent communicating with the smart phone; the second analog signal from the landline telephone is selected from an outgoing call request, a voice signal from a user, a request for the artificial intelligence agent or a response to the artificial intelligence agent.

Embodiments of the present invention also provide a method for providing communication between a smart phone and a landline telephone comprising electrically connecting a phone adapter to the landline telephone; receiving, by the phone adapter, a first wireless signal from the smart phone and delivering a first analog signal to the landline telephone, the first analog signal corresponding to the first wireless signal; and receiving, by the phone adapter, a second analog signal from the landline telephone and delivering a second wireless signal to the smart phone, the second wireless signal corresponding to the second analog signal, wherein the first wireless signal is selected from an incoming call signal, a voice signal from a caller, a notification from the smart phone, and information from an artificial intelligence agent communicating with the smart phone; and the second analog signal from the landline telephone is selected from an outgoing call request, a voice signal from a user, a request for the artificial intelligence agent or a response to the artificial intelligence agent.

In some embodiments, activating two-way communication with the artificial intelligence agent is achieved by lifting a handset of the landline telephone and speaking into a microphone of the handset to communication with the artificial intelligence agent, wherein information from the artificial intelligence agent is delivered to a speaker of the handset via the phone adapter.

In some embodiments, activating two-way communication with the artificial intelligence agent is achieved by depressing an artificial intelligence button of the phone adapter and speaking into a microphone of the phone adapter to communication with the artificial intelligence agent, wherein information from the artificial intelligence agent is delivered to a speaker of the phone adapter.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
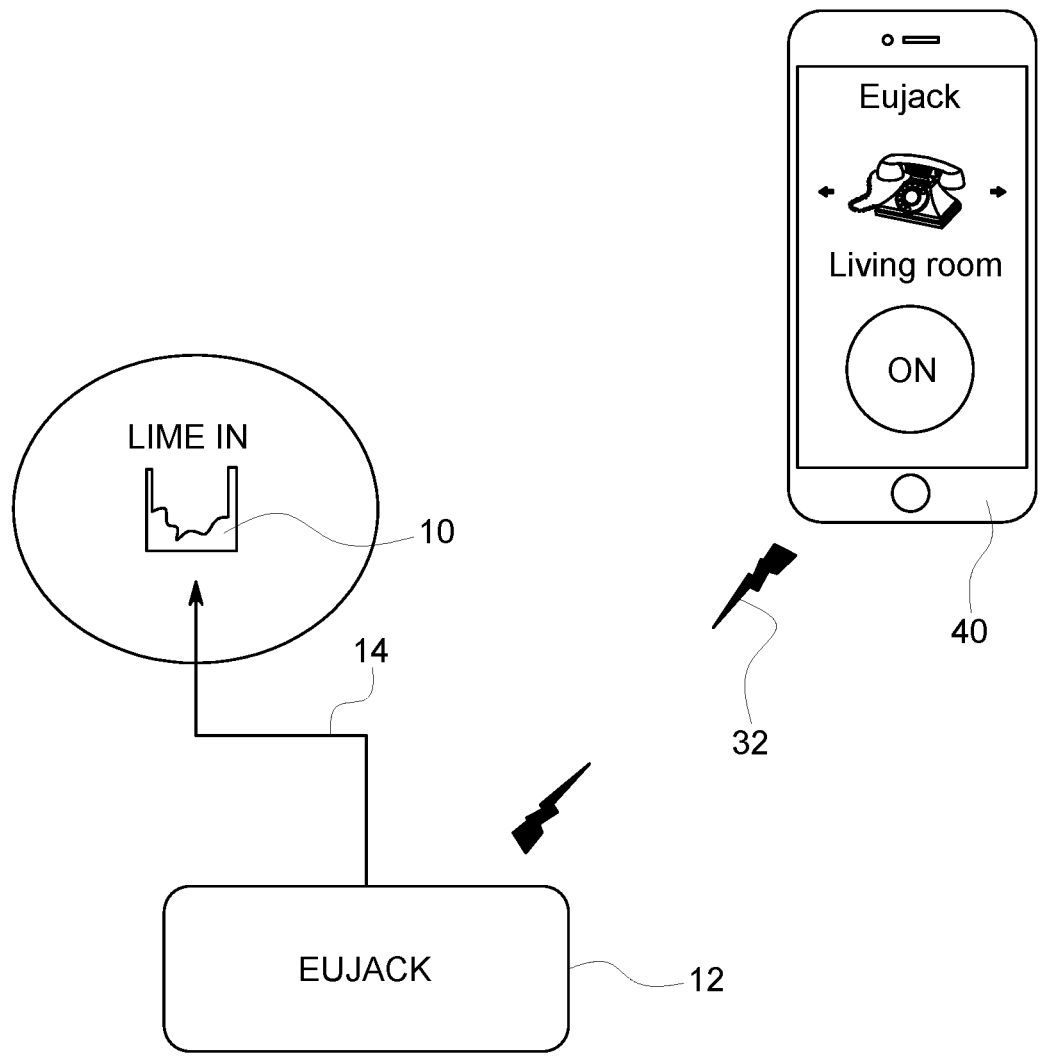
FIG. 1A is a schematic representation of communications between a smartphone, the device according to an exemplary embodiment of the present invention and an analog telephone.
Figure 1B:
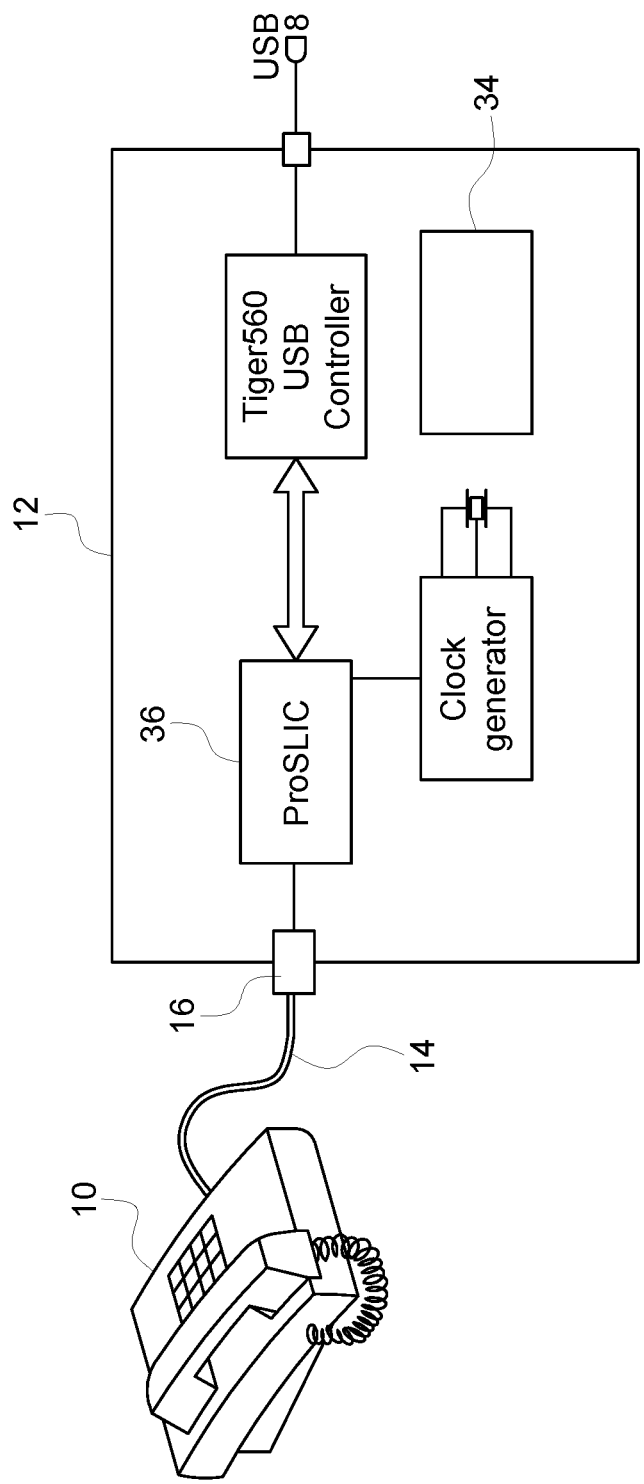
FIG. 1B is a block diagram of the device of FIG. 1A and various connections thereto.
Figure 2:
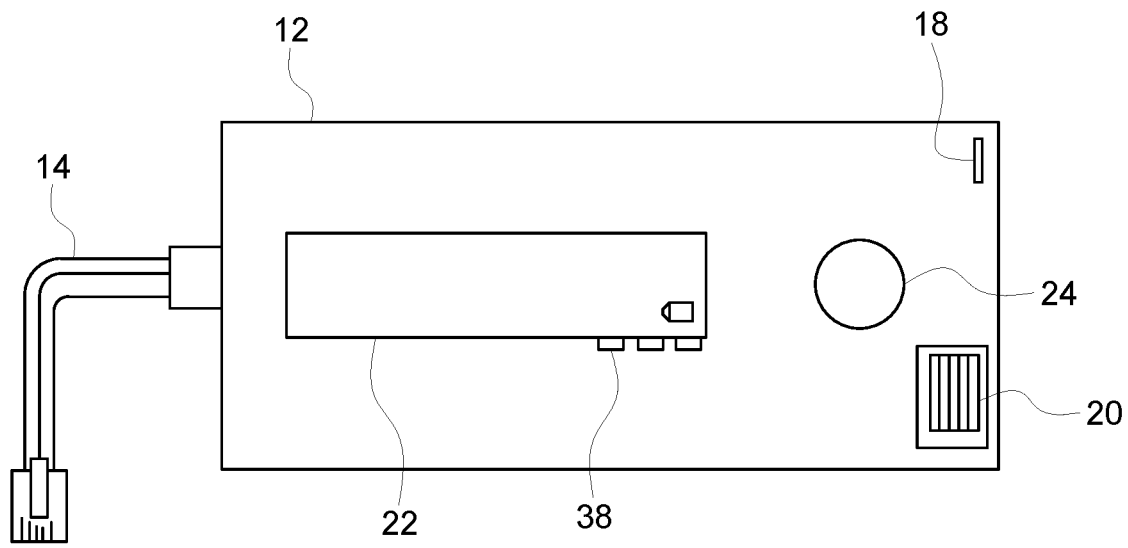
FIG. 2 is a top view of the device of FIG. 1A.
Figure 3:
FIG. 3 is a bottom view of the device of FIG. 1A.
Figure 4:
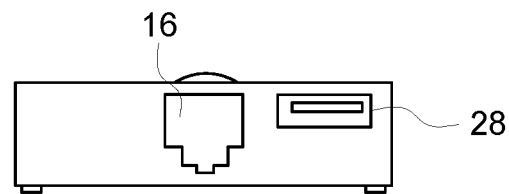
FIG. 4 is a front view of the device of FIG. 1A.
Figure 5:
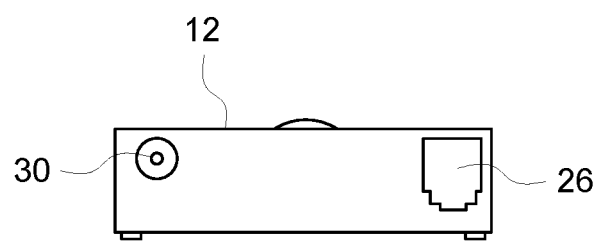
FIG. 5 is a back view of the device of FIG. 1A.
Figure 6:
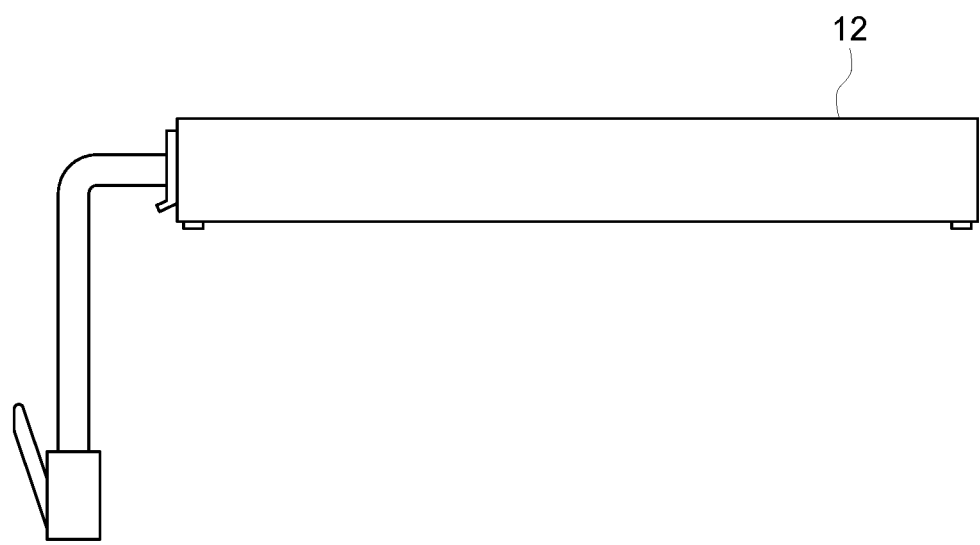
FIG. 6 is a side view of the device of FIG. 1A.
Figure 7:
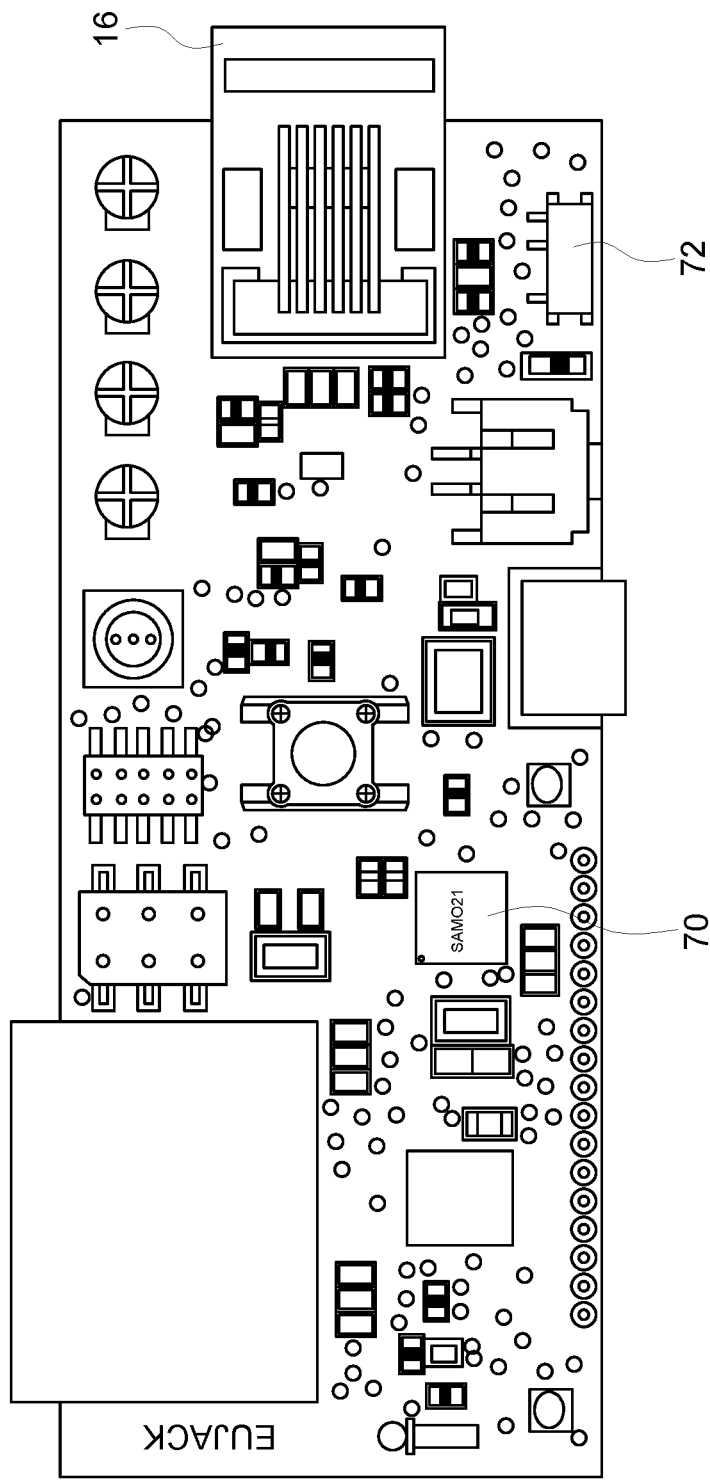
FIG. 7 is an exemplary circuit board used in the device of FIG. 1A.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a device that permits a conventional, analog telephone to connect to a smart phone to provide access to various smart phone features from the analog telephone. For example, the analog telephone can receive or initiate calls and send or receive texts and may provide a secure access point to home automation devices, including Amazon Alexa, Google Home, or the like. The device may be a stand-alone device that connects to an analog telephone or may be integrated into a telephone of any desired design or style. A smart phone application may be used to connect the smart phone to one or more devices to selectively activate features of select ones of the analog telephones. In some embodiments, the device can have its own subscriber identity module (SIM) and its own telephone number to directly send and receive calls or text messages.

As used herein, a "conventional", "landline", "analog", "vintage", or "classic" telephone all refer to a telephone that connects, via a twisted pair wiring configuration, to a plain old telephone service (POTS). Such telephones typically include a RJ-11 connector for connecting a telephone cord thereto. Such telephones can take various forms, designs and styles, but typically include a handset with a microphone and speaker and a base with a dialing feature, including push button, rotary, or touch tone dialing features.

Referring to FIGS. 1A through 6, a landline telephone 10 can connect to the phone adapter 12 via a standard phone cord 14. The phone adapter 12 can include a jack, such as an RJ-11 jack 16 for connecting to the cord 14. The phone adapter 12 can include additional features, as described in greater detail below, including a microphone 18, a speaker 20, a display screen 22, an AI button 24, an input jack 26, a power output jack 28, and an external power jack 30.

The phone adapter 12 can receive data from and send data to a software application loaded on a mobile telecommunications device, such as a smart phone 40. As discussed in greater detail below, a wireless communication protocol 32 may be used to provide wireless communication between the phone adapter 12 and the smart phone 40.

The phone adapter 12 can translate the data it receives from the smart phone 40 into a format that can be read by an existing line in port of a landline telephone 10. For example, when the smart phone 40 has an incoming call, both it and one or more landline telephones 10 connected to one or more phone adapters 12 can ring. The ring of the smart phone 40 can be customized through various phone features, and the ring of the landline telephone 10 is its existing ring. A user may answer the call by answering on the smart phone 40 or the landline telephone 10. When the smart phone 40 gets a text message, the software application can send an alert via the wireless protocol 32 to the phone adapter 12, which, in turn, can alert the user with a predetermined signal, such as a single ring. When the handset of the landline telephone 10 is lifted, the speaker portion of the landline telephone 10 mirrors the information transmitted through the speaker on the smart phone 40.

The phone adapter 12 can translate outgoing data from the landline telephone 10 into a format readable by the software application on the smart phone 40 and transmit that data to the smart phone 40, prompting an appropriate response from the smart phone. For example, when there is an incoming call, lifting the handset on the landline telephone 10 will answer the call on both phones and the user will be able to hear and speak directly from the landline telephone 10. Picking up the handset when no call exists prompts the smart phone 40 to listen to what is being said into the landline telephone 10. This can be done in the same manner as if it were being said into the microphone of the smart phone, allowing Sira or other artificial intelligence (AI) control from the landline telephone 10. Picking up the handset when no call exists and dialing a phone number on the landline telephone 10 can transmit the dialed number to the smart phone 40. Returning the handset of the landline telephone 10 to its cradle can transmit the function of ending the current call on the smart phone 40 or, in the absence of a current call, putting the smart phone 40 to sleep.

A battery 34 in the phone adapter 12 can provide the same power to the landline telephone 10 as if it was connected to a traditional phone line, allowing full function of the landline telephone 10 and making it mobile.

The phone adapter 12 may be centrally controlled by a microcontroller (MCU) 70 that can operate as the master processor and scheduler of the information flow. In some embodiments, an Atmel SAM D21 MCU may be used as the microcontroller 70.

The communications protocol 32 may be selected from various communications protocols known in the art. For example, Wi-Fi and Bluetooth low energy communications may be used to communication between the phone adapter 12 and the smart phone 40. The communication between the phone adapter 12 and the landline telephone 10 is the cord 14 which may rely on a standard, analog, two-wire, "twisted pair" technology. The conversion between digital communications to analog voice can be handled by a subscriber line interface concept (SLIC) codec 36.

The phone adapter 12 can include the display screen 22, which may be an LCD screen, as well as button(s) and LEDs. The display screen 22 can display various messages as well as caller ID information when an incoming call is detected. The LED 38 may be used to indicate various statuses of the phone adapter 12. The phone adapter 12 may further include an on/off slide switch 72, or some other switch to turn the power on and off.

The phone adapter 12 can have various power connections. The phone adapter 12 may receive power through a typical power connector 30. In some embodiments, the phone adapter 12 may receive power from a home phone jack through a connector 26. In some embodiments, the phone adapter 12 may have a power out port 28, such as a micro USB port, for connecting to an electronic device charger, or the like. In other words, a standard smart phone USB charging cable may plug into the phone adapter for charging a user's smart phone, if desired.

As discussed above, the user may pick up the handset of the landline telephone 10 to activate the AI of the smart phone 40. The user may, via the landline telephone 10, have a text message read to them, ask the AI to dial a number, ask the AI a question or the like. Thus, the user may have access to their smart phone's AI via the landline telephone 10. In some embodiments, the phone adapter 12 can include an AI button 24, microphone 18 and speaker 20 to permit handsfree access to the AI of the smart phone 40 without physically picking up the handset of the landline telephone 10.

The software application disposed on the smart phone 40 can be stored in a tangible media on the smart phone 40 and operated by the processor of the smart phone 40 as is known in the art. The functionality of the set-up features of the software application is described with reference to FIG. 8 and the functionality of the main application is described with reference to FIG. 9.

Figure 8:
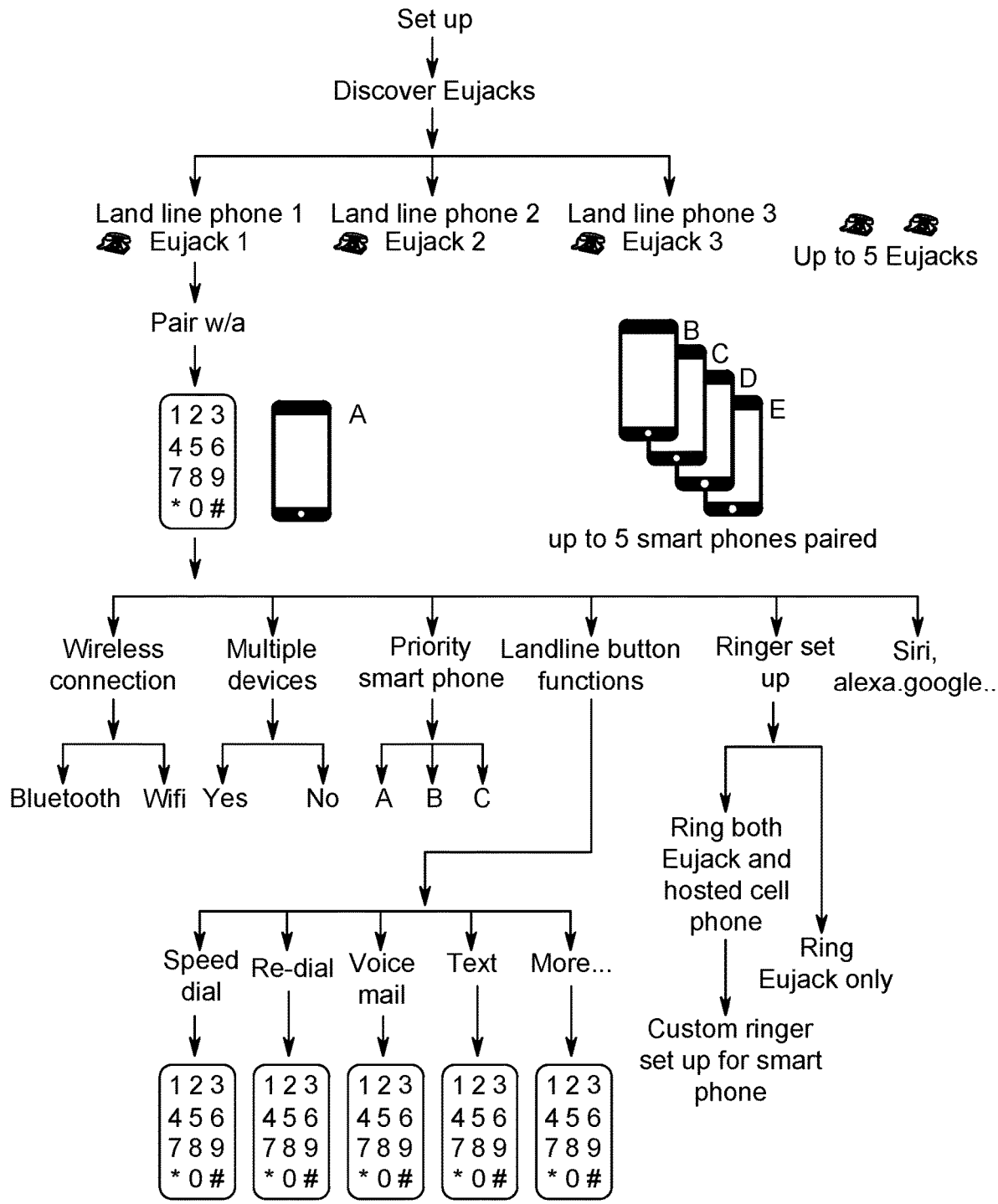
FIG. 8 is a flow chart for the initial set-up of a communication system using the device of FIG. 1A.

Referring to FIG. 8, the set-up application logic is described. The flow chart of FIG. 8 indicates how, in an environment with one or more phone adapters and one or more smart phones, the software application can be setup and configured.

The various phone adapters may be discovered by the software via a wireless protocol. Each phone adapter may be paired with one or more smart phones so that the smart phone may control features of the phone adapter. Various features of the set-up are shown in FIG. 8 and discussed below. Of course, other features, as may be known in the art, may be included within the scope of the present invention.

The software application set-up can include detection of the wireless connection protocol. If multiple protocols are available, the set-up can define each of these communication options. The set-up may include an option to permit multiple smart phones to connect to the phone adapter. If multiple smart phones are allowed to connect to the same phone adapter, then the landline telephone may ring with an incoming call from each smart phone. A smart phone priority option may be provided to determine priority of communication between the phone adapter and the smart phone.

The software application can also provide a ringer set-up option, where the user can select to ring both the smart phone and landline telephone simultaneously or only ring the landline telephone. The software application can also allow both the smart phone and the landline phone to be silenced and the only indication of an incoming call is the illumination of an LED on the phone adapter.

The software application can also provide options with interfacing with the smart phone's AI. In some embodiments, multiple AI's may be available to the user, where, if a user speaks into the landline telephone or into the speaker of the phone adapter after pressing the AI button, the user may dictate which AI to access. For example, the user may state "Siri, read my last text message to me" to access the smart phone's AI, or the user may state "Alexa, add milk to my shopping list" to access a stand-alone AI or home automation agent.

Finally, the software application can provide programming for how depression of various buttons on the landline telephone should be interpreted. For example, speed dial numbers may be programmed, how to re-dial a number may be programmed, how to access voice mail may be programmed, how to retrieve text messages may be programmed or the like. For example, *22 (or star AA) may be used to link the smart phone to Amazon Alexa so that anything said into the landline telephone will be directed, via the smart phone and the installed software, to the appropriate AI. Other programming may include mute features, privacy/ring silence features, auto response features (for example, pressing #1 when the phone is ringing, without lifting the handset of the landline telephone, may answer the call with a stored or pre-recorded message), or the like.

In some embodiments, commands may be programmed into the software application so that when the smart phone receives a key sequence, specific actions are taken, with or without assistance from a user's AI device. For example, *22 7 may be programmed so that the *22 command directs the software application to use Amazon Alexa, and the 7 command may be to lock the front door. Thus, the user can make such a command entry into the landline telephone, and the phone adapter will issue an electronic command to the AI to perform the desired, pre-programmed option.

Figure 9:
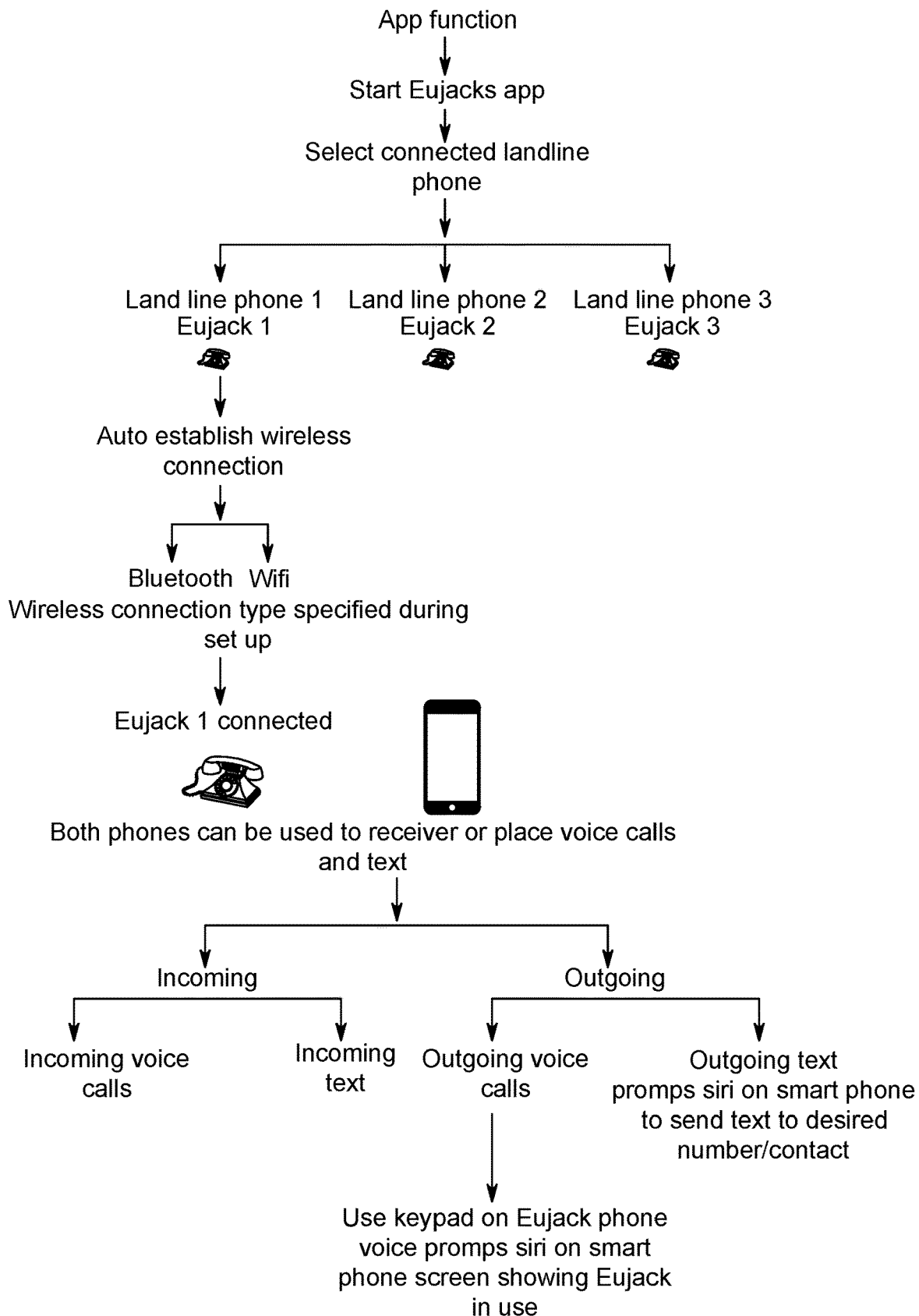
FIG. 9 is a flow chart for use of a smartphone application for communication with the device of FIG. 1A.

Referring now to FIG. 9, one exemplary functional application logic is described, showing how a previously set-up phone adapter interfaces with local mobile devices. The software application allows the user to select which of the phone adapters, if more than one is available, to connect. For example, if a user has a first landline telephone in the living room, a second landline telephone in their bedroom and a third landline telephone in the guest bedroom, the user can select which of these phones may be activated to operate, via the phone adapter, with the smart phone. In some embodiments, different phone adapters may be configured to operate with different smart phones. Thus, if a user has a guest visiting, they may configure their landline phone to interact with their own smart phone, without interfering with any phone adapters connected to the user's smart phone.

In some embodiments, where the caller and the call recipient both have phone adapters, the software application may provide a voice encryption option for privacy or security. In this manner, any wireless signal between the phone adapter and the smart phone and/or between the smart phone and a phone tower, or the like, may be protected via voice encryption that is decoded on the recipient's end via their own phone adapter and/or software application.

Figure 10:
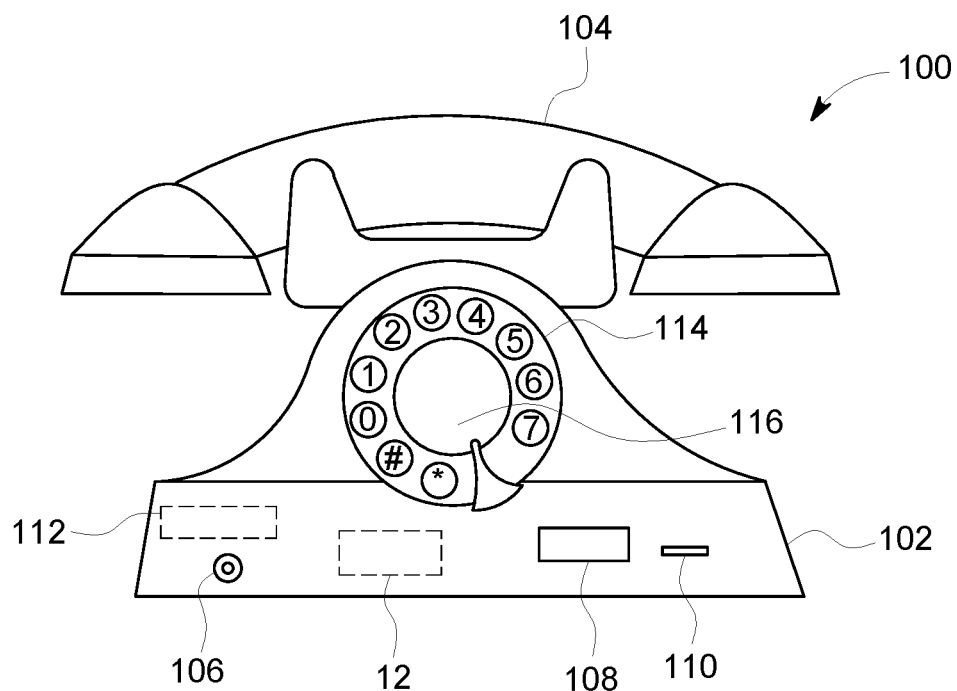
FIG. 10 is an exemplary view of a phone incorporating the device of FIG. 1A.
Figure 11:
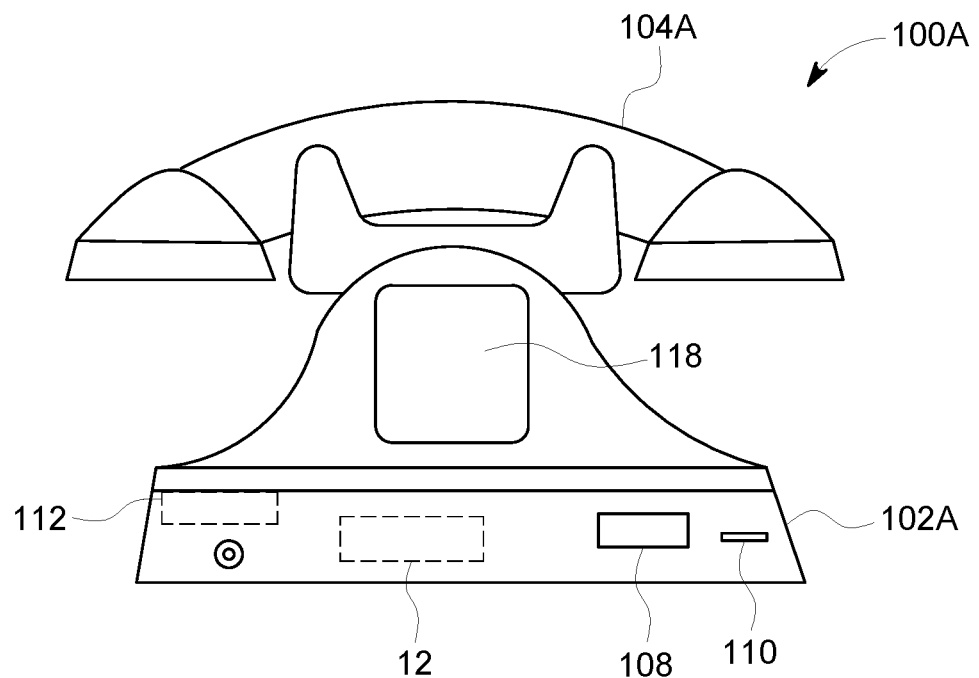
FIG. 11 is an alternate view of a phone incorporating the device of FIG. 1A.

Referring now to FIGS. 10 and 11, a telephone 100, 100A can include a base 102, 102A and a handset 104, 104A. While the base 102, 102A and the handset 104, 104A are shown as two separate components, in some embodiments, a single unit may include both the base and handset together. In some embodiments, the handset 104, 104A may be a cordless handset, as shown, where various wireless communication methods may be used to link the handset to the base. In other embodiments, the handset 104, 104A may be corded and attached to the base 102, 102A to mimic a vintage phone.

The telephone 100, 100A can include the phone adapter 12 as described above built into the base 102, 102A, for example. The telephone 100, 100A can include a power jack 106 for providing power to the telephone 100, 100A and the incorporated phone adapter 12. In some embodiments, the power jack 106 may be used to charge an internal battery 112, which is used to power the telephone 100, 100A and the phone adapter 12.

The telephone 100, 100A can include a speaker 108 and microphone 110 accessible from the exterior thereof. The speaker 108 and microphone 110 may be the same as that used in the phone adapter 12, as described above.

The telephone 100 can include a dial 114 for dialing numbers or accessing various features of the telephone 100. These features may be similar as those discussed above with respect to the telephone dial. The dial 114 may be a push button dial, a rotary dial, or the like. A central button 116 of the dial 114 may be an AI button, similar to the AI button on the phone adapter 12, as described above.

The telephone 100A can include a touch screen 118 in place of the dial 114 of the telephone 100. The touch screen can display caller ID, display text messages, display contacts, display a number dialing pad, display battery strength, or the like.

The cradle 120, 120A for the handset 104, 104A may include a switch for detecting when the handset 104, 104A is placed on the cradle 120, 120A. Such a switch may end a call, end communication with a home automation agent, or the like.

The telephone 100, 100A can operate in a manner similar to the landline telephone described above and used with the phone adapter 12 as a separate unit.

In some embodiments, the phone adapter may include its own telecommunications system, including its own subscriber identity module (SIM) to permit the phone adapter to have its own phone number to send and receive calls without the use of the smart phone. Such a system may be useful if a user desires to make a call from a landline phone and the smart phone has not established communication with the phone adapter.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A communications system comprising:
    a phone adapter configured to electronically attach to a landline telephone; and
    a wireless transceiver in the phone adapter, the wireless transceiver configured to send and receive a wireless signal directly to and from a smart phone that is electronically disconnected from the phone adaptor,
    wherein the communications system configured to enable the landline telephone to interact with the smart phone,
    wherein the communications system permits a user to place a call on the smart phone via the landline telephone, and
    wherein the communications system permits the user to answer a call being made to the smart phone on the landline telephone.

2. The communication system of claim 1, wherein the communications system is configured to send a signal to the landline telephone when a predetermined notification is received by the smart phone.

3. The communication system of claim 2, wherein the predetermined notification is a text message received alert.

4. The communication system of claim 1, wherein the communications system is operable to receive a request to access an artificial intelligence agent and activate the artificial intelligence agent by depressing one or more predetermined buttons on one of the landline phone and the phone adapter.

5. The communication system of claim 4, wherein the artificial intelligence agent is resident on the smart phone.

6. The communication system of claim 5, wherein a microphone on the phone adapter receives a command for the smart phone's artificial intelligence agent.

7. The communication system of claim 5, wherein, when a handset of the landline telephone is lifted, spoken commands spoken into the handset are sent to the smart phone's artificial intelligence agent.

8. The communication system of claim 4, wherein the artificial intelligence agent is a standalone unit, separate from the smart phone.

9. The communication system of claim 1, wherein the software application allows one or more of the phone adapters to be turned on or off.

10. The communication system of claim 1, wherein the phone adapter is powered by an internal battery and the internal battery powers the landline telephone.

11. The communication system of claim 1, wherein the phone adapter is built into the landline telephone to provide an integrated telephone device and a battery is used to power the landline telephone.

12. The communication system of claim 11, wherein the integrated telephone device includes a touchscreen.

13. A communication system comprising:
    one or more phone adapters configured to (1) receive a first wireless signal from a smart phone and deliver a first analog signal to a landline telephone, the first analog signal corresponding to the first wireless signal and (2) receive a second analog signal from the landline telephone and deliver a second wireless signal to the smart phone, the second wireless signal corresponding to the second analog signal, wherein
    the first wireless signal is selected from an incoming call signal, a voice signal from a caller, a notification from the smart phone, and information from an artificial intelligence agent communicating with the smart phone;
    the second analog signal from the landline telephone is selected from an outgoing call request, a voice signal from a user, a request for the artificial intelligence agent or a response to the artificial intelligence agent,
    wherein the communications system permits a user to place a call on the smart phone via the landline telephone,
    wherein the communications system permits the user to answer a call being made to the smart phone on the landline telephone, and
    wherein the communication system permits the user to access the artificial intelligence agent via the landline telephone.

14. The communication system of claim 13, wherein the notification from the smart phone includes at least one of a text message received notification and an email received notification.

15. The communication system of claim 13, further comprising a user-programmable software application on the smart phone configured to customize the first analog signal based on the first wireless signal.

16. A method for providing communication between a smart phone and a landline telephone, comprising:
    electronically connecting a phone adapter to the landline telephone;
    receiving, by the phone adapter, a first wireless signal from the smart phone and delivering a first analog signal to the landline telephone, the first analog signal corresponding to the first wireless signal; and
    receiving, by the phone adapter, a second analog signal from the landline telephone and delivering a second wireless signal to the smart phone, the second wireless signal corresponding to the second analog signal, wherein
    the first wireless signal is selected from an incoming call signal, a voice signal from a caller, a notification from the smart phone, and information from an artificial intelligence agent communicating with the smart phone;
    the second analog signal from the landline telephone is selected from an outgoing call request, a voice signal from a user, a request for the artificial intelligence agent or a response to the artificial intelligence agent;
    the phone adapter permits a user to place a call on the smart phone via the landline telephone;
    the phone adapter permits the user to answer a call being made to the smart phone on the landline telephone, and
    wherein the communication system permits the user to access the artificial intelligence agent via the landline telephone.

17. The method of claim 16, further comprising activating two-way communication with the artificial intelligence agent by lifting a handset of the landline telephone and speaking into a microphone of the handset to communication with the artificial intelligence agent, wherein information from the artificial intelligence agent is delivered to the speaker of the handset via the phone adapter.

18. The method of claim 16, further comprising activating two-way communication with the artificial intelligence agent by depressing an artificial intelligence button of the phone adapter and speaking into a microphone of the phone adapter to communicate with the artificial intelligence agent, wherein information from the artificial intelligence agent is delivered to a speaker of the phone adapter.

* * * * *